(12) United States Patent
Hsiung

(10) Patent No.: US 7,296,887 B1
(45) Date of Patent: Nov. 20, 2007

(54) WINDPROOF GLASSES

(75) Inventor: Seu-Yao Hsiung, Taipei (TW)

(73) Assignee: A Plus La Mode International, Inc., Taipei (TW)

( * ) Notice: Subject to any disclaimer, the term of this patent is extended or adjusted under 35 U.S.C. 154(b) by 0 days.

(21) Appl. No.: 11/519,609

(22) Filed: Sep. 12, 2006

(51) Int. Cl.
*G02C 7/16* (2006.01)

(52) U.S. Cl. .............................. 351/44; 2/449
(58) Field of Classification Search ................ 351/44, 351/41, 111, 121, 158, 62; 2/426, 431, 13, 2/449
See application file for complete search history.

(56) References Cited

U.S. PATENT DOCUMENTS 5,394,567 A * 3/1995 Vatterott ..................... 2/449
6,062,688 A * 5/2000 Vinas ......................... 351/47

* cited by examiner

*Primary Examiner*—Hung Xuan Dang
(74) *Attorney, Agent, or Firm*—William E. Pelton, Esq.; Cooper & Dunham LLP

(57) ABSTRACT

A pair of windproof glasses has a frame assembly and a windproof shield assembly. The frame assembly has a frame, two lenses, two legs and at least two first engaging elements embedded in the frame. The windproof shield assembly mounted detachably on the frame assembly and has two windproof shields mounted detachably on sides of the frame. Each windproof shield has at least one engaging element detachably engaging respectively with at least one of the at least two first engaging elements with a magnetic force. A wearer may quickly attach the windproof shields to the frame without sequentially align the first and second engaging elements.

8 Claims, 5 Drawing Sheets

WINDPROOF GLASSES

BACKGROUND OF THE INVENTION

1. Field of the Invention

The present invention relates to glasses, and more particularly to a pair of windproof glasses that can be assembled and disassembled quickly.

2. Description of Related Art

Glasses such as nearsighted glasses, reading glasses and sunglasses are used widely in the world to improve people's vision or shield their eyes from the sunlight.

Furthermore, windproof glasses have been developed to prevent people's eyes from wind and dust.

With reference to FIG. 5, a pair of conventional windproof glasses has two eye frames (90), two lenses, two legs (91) and a two windproof shields (93).

The eye frames (90) are connected with each other and each eye frame (90) has an opening, an upper mounting tab (901) and a lower mounting tab. The opening is defined through the eye frame (90). The upper mounting tab (901) is formed and extends from the eye frame (90) and has a pin hole defined through the upper mounting tab (901). The lower mounting tab is formed and extends from the eye frame (90) below the upper mounting tab (901) and has a pin hole defined through the lower mounting tab.

The lenses are mounted respectively in the openings in the eye frames (90).

The legs (91) are pivotally mounted respectively on the eye frames (90).

The windproof shields (93) are made of soft material, are detachably mounted respectively on the eye frames (90) and each windproof shield (93) has two mounting pins (931). The mounting pins (931) are mounted on the windproof shield (93) and are detachably mounted respectively in the pin holes in the upper mounting tab (901) and the lower mounting tab on a corresponding eye frame (90).

However, the upper mounting tabs (901) and the lower mounting tabs extending toward and pressing against a wearer's face causes the wearer uncomfortable and event hurts the wearer's face.

Furthermore, the mounting pins (931) and pin holes in the mounting tabs are too little so the wearer have to pay much attention to mount each mounting pin (931) in a corresponding pin hole when assembling the windproof shields (93) to the eye frames (90). Therefore, assembling the windproof shields (93) to the eye frames (90) wastes time.

To overcome the shortcomings, the present invention provides a pair of windproof glasses to mitigate or obviate the aforementioned problems.

SUMMARY OF THE INVENTION

The main objective of the invention is to provide a pair of windproof glasses that can be assembled and disassembled quickly.

A pair of windproof glasses has a frame assembly and a windproof shield assembly. The frame assembly has a frame, two lenses, two legs and at least two first engaging elements embedded in the frame. The windproof shield assembly mounted detachably on the frame assembly and has two windproof shields mounted detachably on sides of the frame. Each windproof shield has at least one engaging element detachably engaging respectively with at least one of the at least two first engaging elements with a magnetic force.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
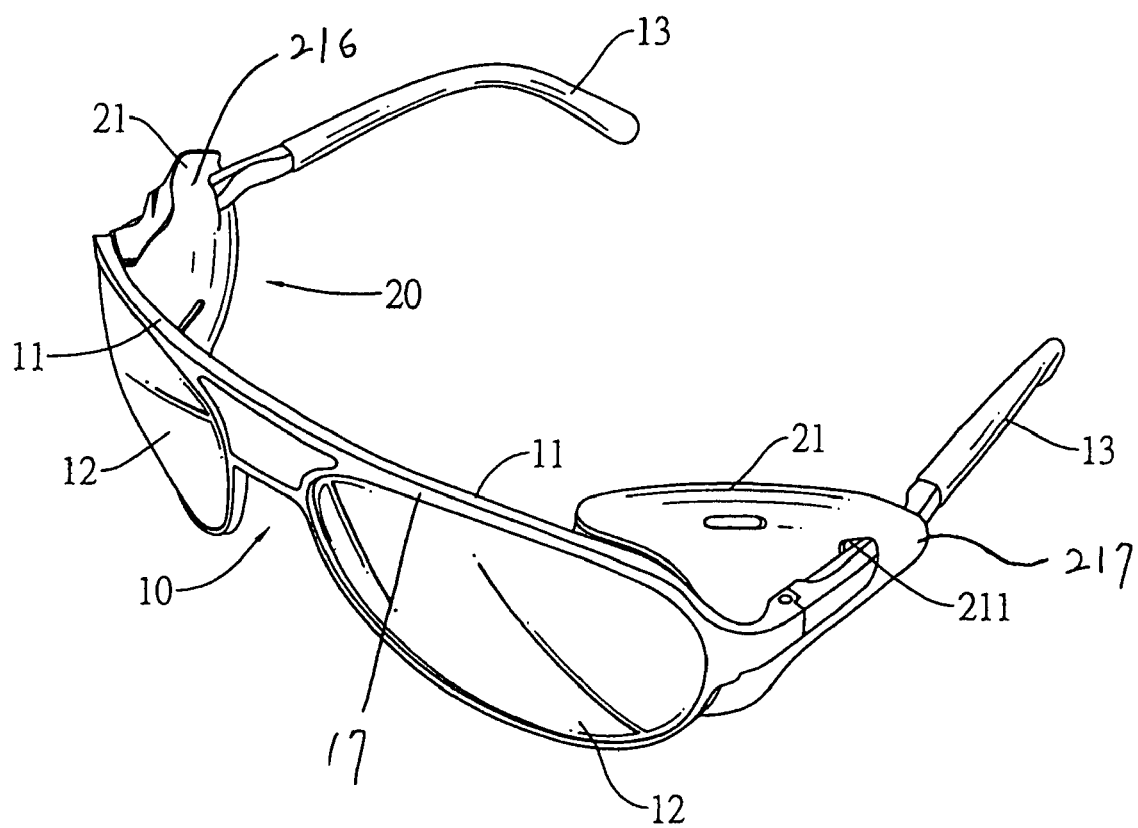
FIG. 1 is a perspective view of a first embodiment of a pair of windproof glasses in accordance with the present invention.
Figure 3:
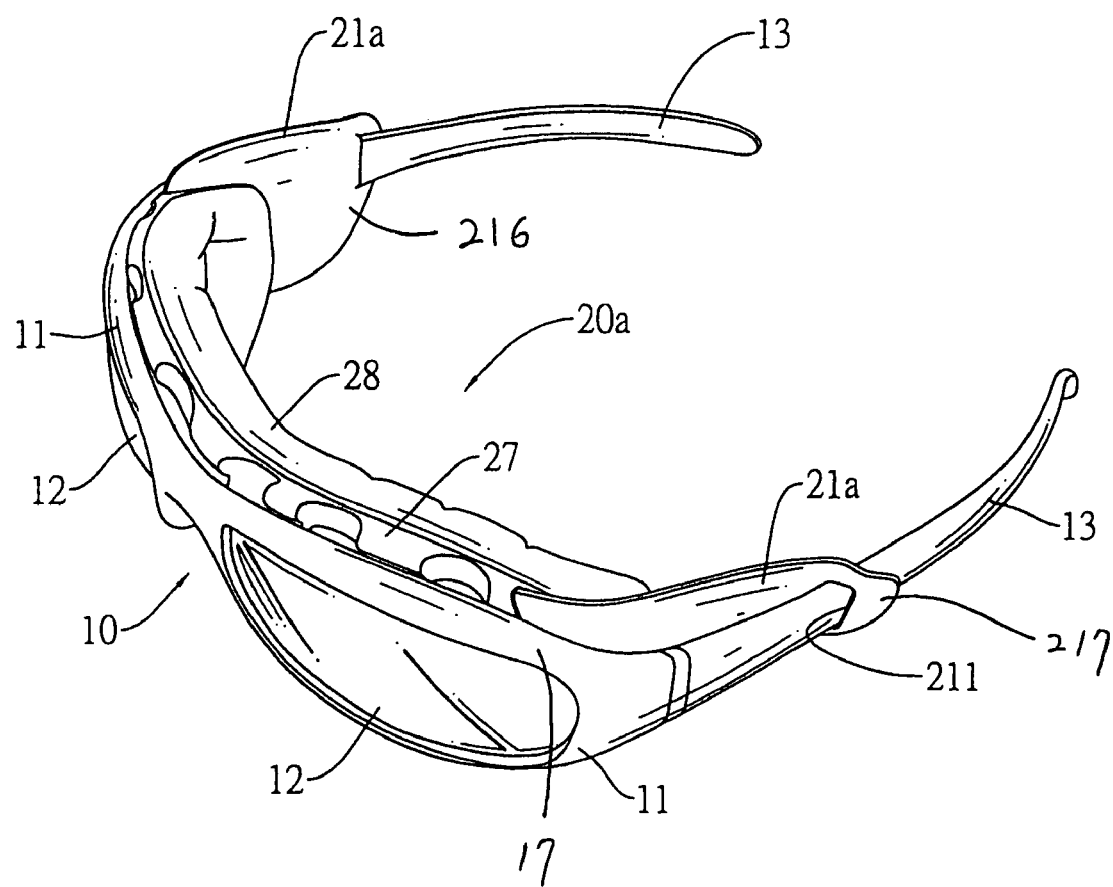
FIG. 3 is a perspective view of a second embodiment of the pair of the windproof glasses in accordance with the present invention.

With reference to FIGS. 1 and 3, a pair of windproof glasses in accordance with the present invention comprises a frame assembly (10) and a windproof shield assembly (20, 20a).

Figure 2:
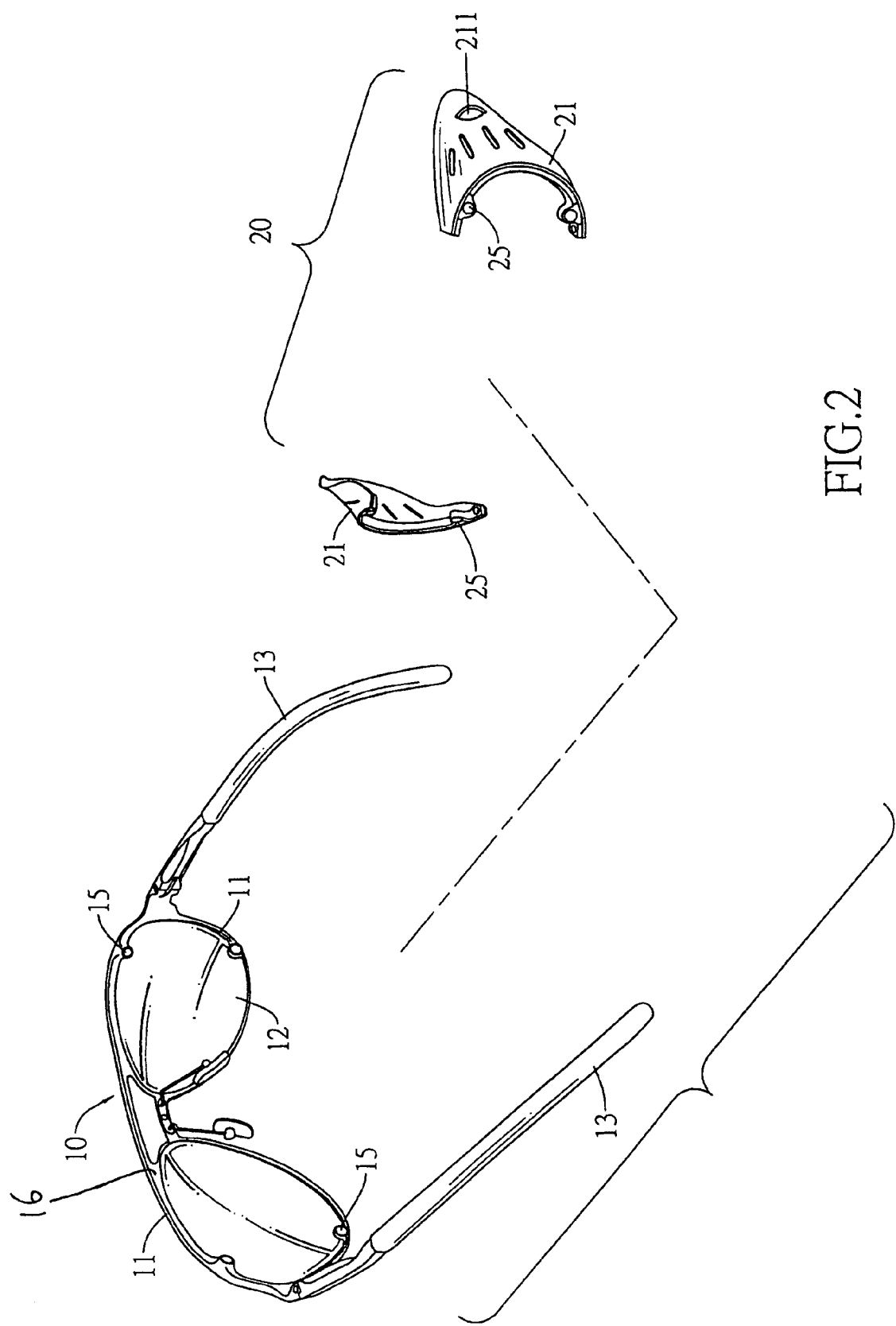
FIG. 2 is a partially exploded perspective view of the pair of the windproof glasses in FIG. 1.
Figure 4:
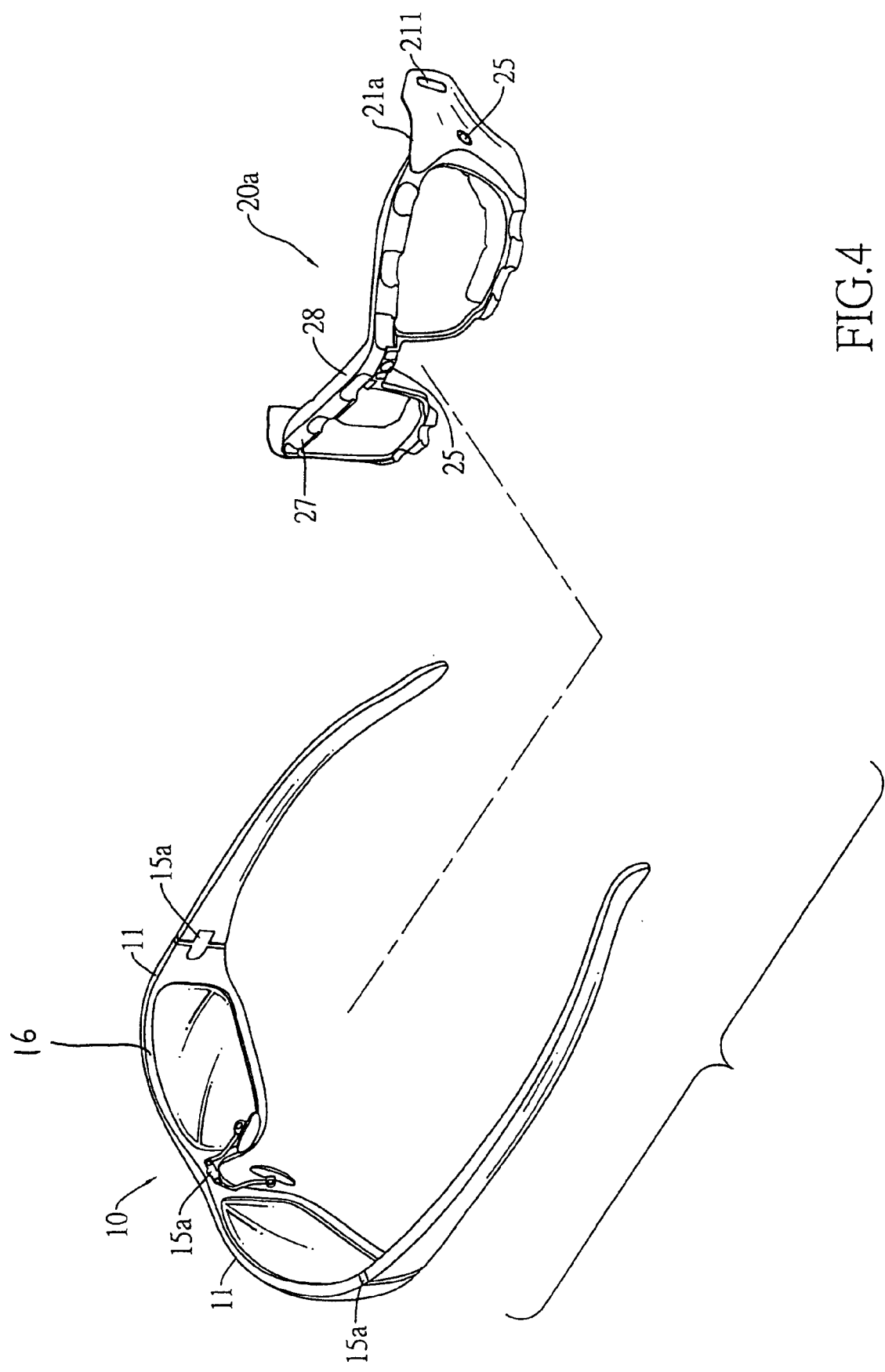
FIG. 4 is a partially exploded perspective view of the pair of the windproof glasses in FIG. 3.
Figure 5:
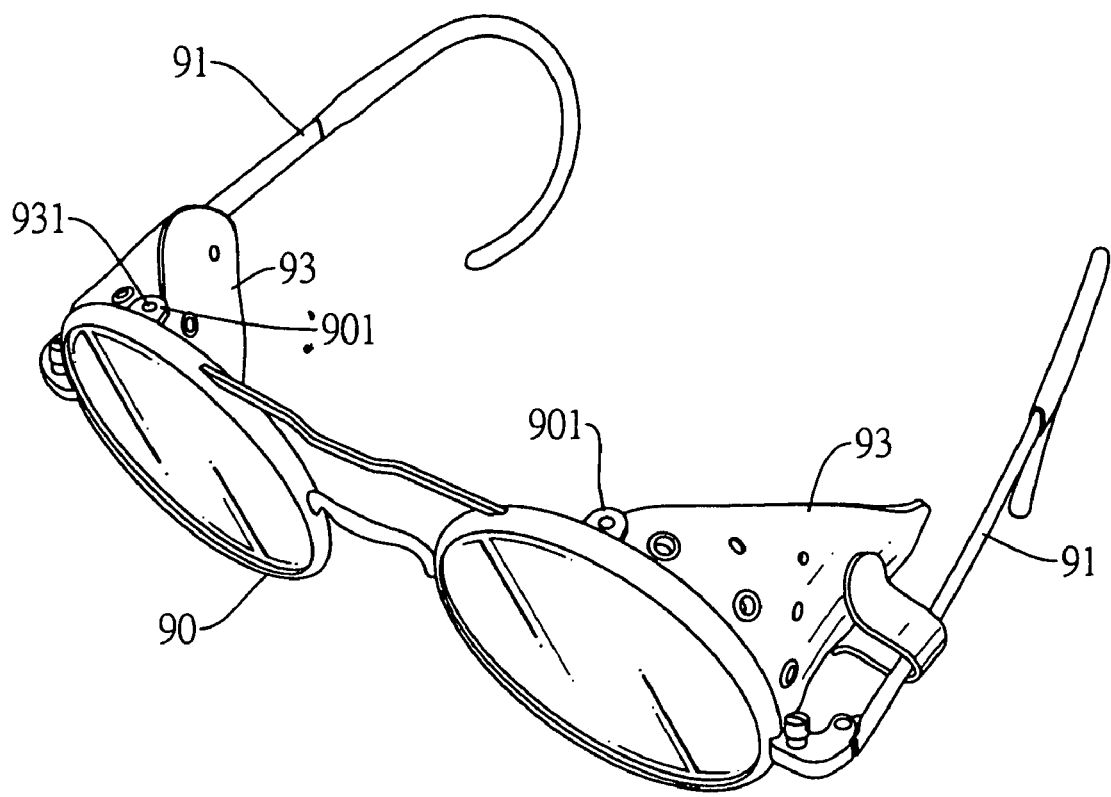
FIG. 5 is a perspective view of a pair of conventional windproof glasses in accordance with the prior art.

With further reference to FIGS. 2 and 4, the frame assembly (10) has a frame, at least one lens (12), two legs (13) and at least two first engaging elements (15, 15a).

The frame has two opposite sides, a front outer surface (17) and a rear inner surface (16) and may have two lens frame segments (11). In first and second embodiments of the pair of the windproof glasses, the frame (12) has two lens frame segments (11) connected to each other through a connection segment and each lens frame segments (11) has an outside.

The at least one lens (12) is mounted on the frame. In the first and second embodiments of the pair of the windproof glasses, the frame assembly (10) has two lenses (12) mounted respectively on the lens frame segments (11) of the frame.

The legs (13) are mounted respectively on the sides of the frame and may be mounted respectively on the outsides of the two lens frame segments (11). Each leg (13) has a proximal end and a distal end. The proximal end connects to one of the sides of the frame. The distal end is opposite to the proximal end.

The at least two first engaging elements (15, 15a) are made of magnets or metal, are embedded in the frame. In the first embodiment of the pair of the windproof glasses, the frame assembly (10) has two side sets of at least one first engaging element (15) embedded respectively in the lens frame segments (11) of the frame. In the second embodiment of the pair of the windproof glasses, the frame assembly (10) has two side sets of at least one first engaging element (15a) embedded respectively in the lens frame segments (11) and a central set of at least one first engaging elements (15a) embedded in the connection segment of the frame.

The windproof shield assembly (20, 20a) is mounted detachably on the frame assembly (10) and has two windproof shields (21, 21a) and may have a connection bracket (27) and a face pad (28).

The windproof shields (21, 21a) are made of soft material such as fabric, rubber and plastic and are detachably mounted respectively on the sides of the frame to prevent wind and dust. Each windproof shield (21, 21a) has an outer surface (217), an inner surface (216), an attachment section and at least one second engaging element (25) and may have a mounting hole (211).

The attachment section detachably abuts the rear inner surface (16) of the frame instead of the front outer surface (17).

The at least one second engaging element (25) is embedded in the attachment section of the windproof shield (21, 21a) and detachably engages respectively with at least one of the at least two first engaging elements (15, 15a) on the frame with an magnetic attractive force. Each second engaging element (25) is made of metal when each corresponding first engaging element (15, 15a) is a magnet, or is a magnet when each corresponding first engaging element (15, 15a) is made of metal or a magnet. In the first and second embodiments, that at least one second engaging element (25) detachably engages respectively with the at least one first engaging element (15) of a corresponding side set on the frame.

The mounting hole (211) is defined through the windproof shield (21, 21a) and allows a corresponding leg (13) to extend through the mounting hole (211). The distal end of the leg (13) extends backward into the outer surface (217) of the windproof shield (21, 21a) and then extends out of the inner surface (216) of the windproof shield (21, 21a) when the leg (13) extends through the mounting hole (211).

In the second embodiment of the pair of the windproof glasses, the connection bracket (28) is connected to the windproof shields (21a), is mounted detachably on the frame of the frame assembly (10) and has at least one second engaging element (25) embedded in the connection bracket (28) and detachably engaging respectively with the at least one first engaging element (15a) of the central set. The face pad (28) is made of resilient material such as foam and is mounted on the connection bracket (27) to softly touch a wearer's face.

Because the first and second engaging elements (15, 15a, 25) engages with each other through a magnetic attractive force, a wearer may quickly attach the windproof shields (21, 21a) to the frame without sequentially align the first engaging element (15, 15a) with the second engaging elements (25). Furthermore, the first and second engaging elements (15, 15a, 25) are embedded in the frame and windproof shields (21, 21a) instead of protruding out so the wearer may safely wear the pair of the windproof glasses without being hurt by the first and second engaging elements (15, 15a, 25).

Even though numerous characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A pair of windproof glasses comprising:
    a frame assembly having
        a frame having two opposite sides, a front outer surface and a rear inner surface;
        at least one lens;
        two legs mounted respectively on the sides of the frame, and each leg having
            a proximal end connecting to one of the sides of the frame; and
            a distal end being opposite to the proximal end; and
        at least two first engaging elements embedded in the frame; and
    a windproof shield assembly mounted detachably on the frame assembly and having
        two windproof shields made of soft material, detachably mounted respectively on the sides of the frame and each windproof shield having
            an outer surface;
            an inner surface;
            an attachment section, being a front outer section and detachably abutting the rear inner surface of the frame;
            at least one second engaging element embedded in the attachment section of the windproof shield and detachably engaging respectively with at least one of the at least two first engaging elements with a magnetic attractive force; and
            a mounting hole defined through the windproof shield and through which one of the legs extends, and the distal end of the leg extending backward into the outer surface of the windproof shield and then extending out of the inner surface of the windproof shield when the leg extends through the mounting hole.

2. The pair of windproof glasses as claimed in claim 1, wherein:
    the frame has two lens frame segments connected to each other through a connection segment;
    the frame assembly has two side sets of at least one first engaging element embedded respectively in the lens frame segments and a central set of at lest one first engaging elements embedded in the connection segment of the frame;
    the at least one second engaging element of each windproof shield detachably engages respectively with the at least one first engaging element of a corresponding side set on the frame; and
    the windproof shield assembly further has
        a connection bracket connected to the windproof shields, mounted detachably on the frame of the frame assembly and having at least one second engaging element embedded in the connection bracket and detachably engaging respectively with the at least one first engaging element of the central set; and
        a face pad made of resilient material and mounted on the connection bracket.

3. The pair of the windproof glasses as claimed in claim 2, wherein:
    the at least two first engaging elements are made of magnets; and
    the at least one second engaging element of each windproof shield is made of metal.

4. The pair of the windproof glasses as claimed in claim 2, wherein:
    the at least two first engaging elements are made of metal; and
    each one of the at least one second engaging element of each windproof shield is magnetic.

5. The pair of the windproof glasses as claimed in claim 2, wherein each windproof shield is made of fabric.

6. The pair of the windproof glasses as claimed in claim 2, wherein each windproof shield is made of rubber.

7. The pair of windproof glasses as claimed in claim 2, wherein each windproof shield is made of plastic.

8. The pair of the windproof glasses as claimed in claim 2, wherein the face pad is made of foam.

* * * * *